Jan. 28, 1958  H. SCHWAB  2,821,408
VEHICLE WITH A PLURALITY OF WHEEL AXLES
AND SUSPENSION MEANS THEREFOR
Filed May 14, 1956
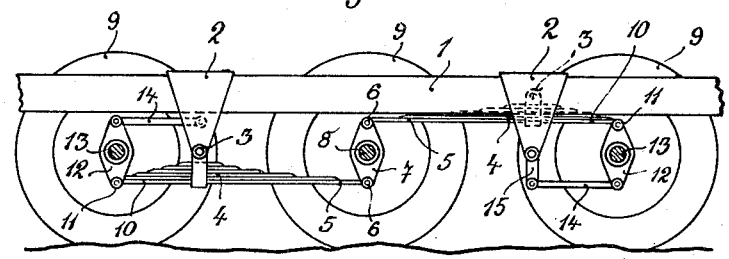
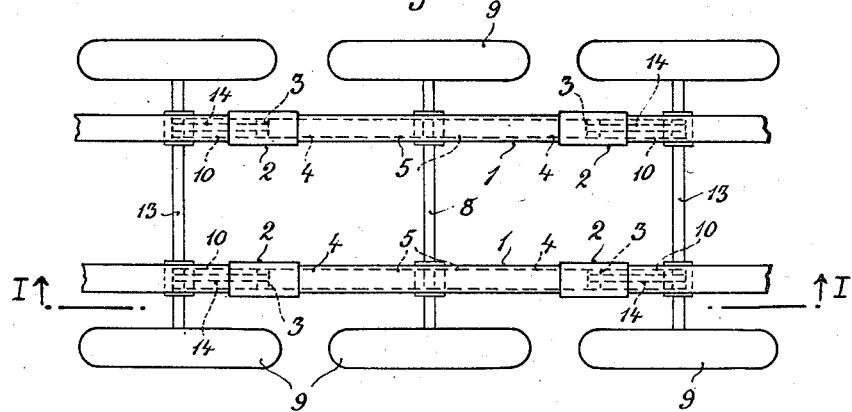
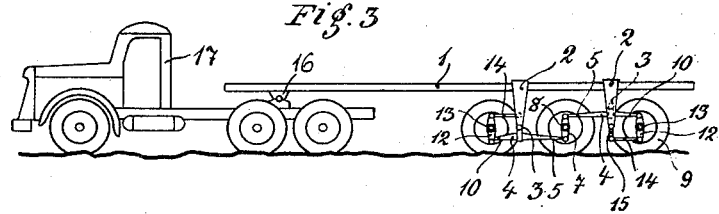
INVENTOR.
HANS SCHWAB
BY

United States Patent Office 2,821,408
Patented Jan. 28, 1958

2,821,408

VEHICLE WITH A PLURALITY OF WHEEL AXLES AND SUSPENSION MEANS THEREFOR

Hans Schwab, Pfaffenhofen, Roth, near Neu-Ulm, Germany, assignor to Karl Kassbohrer Fabrizeugwerke G. m. b. H., Ulm-Danube, Germany Application May 14, 1956, Serial No. 584,571

Claims priority, application Germany May 18, 1955

4 Claims. (Cl. 280—104.5)

This invention relates generally to vehicles and more particularly to trailers provided with a group of three wheel axles arranged one behind the other. Such trailers are mostly employed, for example, for transporting long objects, such as long iron beams, timber and the like in order to maintain the pressure on the wheels within permissible limits. Heretofore it has been customary to arrange the three axles in such a manner that two of them are connected to the vehicle frame by means of a common set of semi-elliptical leaf springs acting in conjunction with a pendulum axle, while the third axle is connected to the frame by means of a semi-elliptical leaf spring set of its own.

One of the important objects of the invention is therefore to connect the axles which are arranged one behind the other, to the vehicle frame in a very efficient but simple manner, so as to effect a considerable weight reduction as well as a good load distribution and weight balance between the three axles.

The invention contemplates in a multi-axle vehicle provided with three wheel axles arranged one behind the other the provision of two sets of leaf springs which are arranged, respectively, one behind the other on the vehicle frame and asymmetrically by means of brackets, these springs supporting with their short ends the two outermost axles and with their adjacent long ends the central axle.

Another characteristic feature of the invention is that the leaf springs are divided by the brackets in the ratio of 2:1, measured from the central axle. A further characteristic feature of the invention resides in the fact that the leaf springs are stepped with respect to one another and connected at their ends to equi-armed double levers pivotally connected to the axles for movement in respective vertical planes. It is further advantageous to connect the outer axles directly or indirectly to the frame by means of a push or connecting rod linked to the double lever. Still a further characteristic feature of the invention is to provide means facilitating the construction of all the leaf spring sets and axles with double levers and push rods to be substantially identical and interchangeable.

These and other objects of the invention will become further apparent from the following detailed description, reference being made to the accompanying drawing showing a preferred embodiment of the invention.

In the drawing:

Fig. 1 is a side elevational view of a portion of a vehicle frame constructed in accordance with the present invention, the view being taken along the line I—I in Fig. 2;

Fig. 2 is a top plan view of the aforesaid vehicle portion; and

Fig. 3 is a side elevational view of a truck and trailer combination embodying the present invention.

Referring now more particularly to the drawing, a vehicle frame 1 is provided on both sides with downwardly extending brackets 2. Asymmetrically suspended from each bracket 2 by means of a link 3 is a leaf spring set 4 so that each set is divided approximately in a ratio of 2:1 as measured from the central axle 8 of the vehicle. The spring sets 4, as may be seen from Fig. 2 lie directly beneath the longitudinal frame beams or elements of the vehicle or trailer frame 1, but these spring sets could, of course, be located between or on the outsides of said frame elements. The spring sets are asymmetrically located with respect to the vehicle frame and as may be seen from Fig. 1, are stepped with respect to one another successively. The adjacent and longer ends 5 of the spring sets 4 are pivotally connected by means of hinge bolts 6 to the opposite ends of an equal arm lever 7 which is vertically fixed to the central axle 8 so that both bolts 6 are located in the same vertical plane. Wheels 9 are mounted on the axle 8 in a known manner.

The shorter ends 10 of the spring sets 4 are connected by means of hinge or pivot 11 to equi-armed levers 12 fixed to axles 13 located on opposite sides of the central axle 8. Thus, the end 10 of the lower set of springs 4 is connected to the lower end of the corresponding lever 12, while the end 10 of the upper set of springs 4 is connected to the upper end of its corresponding lever 12.

The respective opposite ends of the levers 12 are each connected by means of connecting rods 14 to the adjacent spring-supporting bracket 2, the connection shown at the left hand side of Fig. 1 being directly while the connection between the connecting rod and the bracket at the right hand end of Fig. 1 is indirectly effected through the intermediary of a connecting link 15. Wheels 9 are likewise mounted on the axles 13 in a conventional manner.

The illustrated arrangement is characterized by an extremely simplified construction since in contradistinction to known arrangements it is possible to dispense with two further sets of springs while nevertheless all spring sets are identical with one another. This possibility of identical construction applies also, of course, to the axles, the double-armed levers and the push or connecting rods. Likewise, the spring-supporting brackets are of uniform construction. Besides the advantage of simplified economical construction as set forth above, the present invention enables a considerable weight reduction to be effected in comparison with known constructions.

Even further, the aforesaid arrangement permits the load to be substantially equally distributed and balanced between various individual axles or wheels. This is due to the fact that the spring sets are so arranged that about two thirds of the spring strength is concentrated at the shorter ends while about one third is concentrated at the longer ends of the springs.

Since the central axle is supported by the two long spring ends, it is subjected to the same spring force as the outer axles connected to the shorter spring ends. By means of the scale-like suspension of the spring sets the load distribution or balance beneath the vehicle frame is further improved, this being especially advantageous when the load support or transfer location, for example, a rotatable seat or bearing, is arranged vertically above the central axle 8. The braking forces of the outer wheels 9 are transmitted by means of the push rods 14 in a simple manner to the brackets 2 and through the latter to the vehicle frame 1. The braking force of the central wheels 9, however, is taken up by the vehicle frame via the long ends 5 of the spring sets 4 and the brackets 2.

It can thus be seen that there has been provided according to the invention a vehicle frame having a group of three successively disposed wheel axles; comprising two spring sets each having a plurality of superpositioned leaf spring elements including a base spring element and a top spring element, respectively, brackets located spaced apart on and depending from said frame and supporting said spring sets on levels one above the other, but in staggered relation to each other, the base spring element being relatively longer than said top spring element, said top spring element of each spring set being located symmetrically with respect to the corresponding bracket, said base spring element of each spring set being located asymmetrically with respect to the coresponding bracket, whereby said base spring element of each spring set is divided by its bracket in a ratio of 2:1.

All of said axles are provided with respective equi-armed levers, and means operatively connecting the ends of the base element of each spring set with corresponding ends of said levers and in such manner that the outer axles are connected with the shorter ends of the respective base spring elements of said spring sets, the ends of the lever on the central axle being pivotally connected to the longer ends of said base spring elements, respectively.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A vehicle frame having a group of three successively disposed wheel axles; comprising two spring sets, brackets depending from said frame and supporting said spring sets successively and on levels one above the other, but in staggered relation to each other, each of said spring sets having a relatively long base element and a relatively short top element, said top element of each spring set being located symmetrically with respect to the corresponding bracket, said base element of each spring set being located asymmetrically with respect to the corresponding bracket, said axles being provided with respective equi-distant arm levers, and means operatively connecting the ends of the base element of each spring set with corresponding adjacent ends of said arm levers and in such manner that the outer axles are connected with the shorter ends of the respective base elements of said spring sets, the ends of the arm lever on the central axle being respectively located above and below said central axle and being pivotally connected to the longer ends of said base elements, respectively of said two spring sets.

2. A vehicle frame having a group of three successively disposed wheel axles; comprising two spaced apart leaf spring sets, each positioned between two adjacent axles, one outer axle and a central axle, respectively, brackets extending from said frame for supporting said spring sets at different levels and in staggered relation to each other, each spring set having a relatively long base element and a relatively short top element, said top elements being arranged symmetrically with respect to the brackets, said base elements being asymmetrically located with respect to said brackets to thereby provide short end portions and long end portions of said base elements of said spring sets, and means operatively connecting the base elements of said spring sets to said axles in such a manner that the outer axles are connected with the short end portions of said base elements, whereas the median axle is connected to the long end portions of said base elements of said spring sets.

3. A vehicle frame having a group of three successively disposed wheel axles; comprising two spring sets each having a plurality of superpositioned leaf spring elements including a base spring element and a top spring element, respectively, brackets located spaced apart on and depending from said frame and supporting said spring sets on levels one above the other, but in staggered relation to each other, the base spring element being relatively longer than said top spring element, said top spring element of each spring set being located symmetrically with respect to the corresponding bracket, said base spring element of each spring set being located asymmetrically with respect to the corresponding bracket, whereby said base spring element of each spring set is divided by its bracket in a ratio 2:1, said axles being provided with respective equi-distant arm levers, and means operatively connecting the ends of the base element of each spring set with coresponding ends of said arm levers and in such manner that the outer axles are connected with the shorter ends of the respective base spring elements of said spring sets, the ends of the arm lever on the central axle being pivotally connected to the longer ends of said base spring elements, respectively.

4. A vehicle frame having a group of three successively disposed wheel axles; comprising two spring sets each having a plurality of superpositioned leaf spring elements including a base spring element and a top spring element, respectively, brackets disposed in spaced apart relation on and depending from said frame and supporting said spring sets on levels one above the other, but in staggered relation to each other, the base spring element of each spring set being relatively longer than said top spring element, said top spring element of each spring set being located symmetrically with respect to the corresponding bracket, said base spring element of each spring set being located asymmetrically with respect to the corresponding bracket, whereby said base spring element of each spring set is divided by its bracket in a ratio of 2:1, said axles being provided with respective equi-armed levers, means operatively connecting the ends of the base element of each spring set with corresponding ends of said equi-armed levers and in such manner that the one ends of said levers on the outer axles are connected with the shorter ends of the respective base spring elements of said spring sets, the ends of the equi-armed lever on the central axle being pivotally connected to the longer ends of said base spring elements, respectively, and connecting rods pivotally joining the other ends of said equi-armed levers of said outer axles to the respective brackets.

References Cited in the file of this patent

UNITED STATES PATENTS 1,694,422     Leytens ---------------- Dec. 11, 1928

FOREIGN PATENTS 520,672     Germany -------------- Mar. 13, 1931

UNITED STATES PATENT OFFICE
CERTIFICATE OF CORRECTION

Patent No. 2,821,408                          January 28, 1958

Hans Schwab

It is hereby certified that error appears in the above numbered patent requiring correction and that the said Letters Patent should read as corrected below.

In the grant, lines 2 and 3, for "assignor to Karl Kassbohrer Fabrizeugwerke G. m. b. H., of Ulm-Danube, Germany" read -- assignor to Karl Kassbohrer Fahrzeugwerke G. m. b. H., of Ulm-Danube, Germany --; line 12, for "Karl Kassbohrer Fabrizeugwerke G. m. b. H., its successors" read -- Karl Kassbohrer Fahrzeugwerke G. m. b. H., its successors --; and that in the heading of the printed specification, lines 5 and 6, for "assignor to Karl Kassbohrer Fabrizeugwerke G. m. b. H., Ulm-Danube, Germany, read -- assignor to Karl Kassbohrer Fahrzeugwerke G. m. b. H., Ulm-Danube, Germany.

Signed and sealed this 29th day of April 1958.

(SEAL)

Attest:

KARL H. AXLINE
Attesting Officer

ROBERT C. WATSON
Commissioner of Patents